US008289958B1

(12) United States Patent
Narayanan

(10) Patent No.: US 8,289,958 B1
(45) Date of Patent: Oct. 16, 2012

(54) USING A CLEARINGHOUSE TO DETERMINE CALLER LOCATION FOR VOIP CALLS

(75) Inventor: Sathiya Narayanan, Leesburg, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 1591 days.

(21) Appl. No.: 11/325,892

(22) Filed: Jan. 5, 2006

(51) Int. Cl.
*H04L 12/66* (2006.01)
*H04L 12/56* (2006.01)
*H04L 12/427* (2006.01)
*G06F 12/06* (2006.01)
*G06F 15/16* (2006.01)
*H04M 1/57* (2006.01)

(52) U.S. Cl. ........ 370/389; 370/392; 370/352; 370/353; 370/354; 370/355; 711/202; 379/142.01; 709/219

(58) Field of Classification Search ............ 370/395.54, 370/378, 352–356, 389, 392, 395.2; 379/142.1, 379/142.01; 709/216–219, 223–227; 711/1–6, 711/202, 205
See application file for complete search history.

(56) References Cited

U.S. PATENT DOCUMENTS

| 6,643,516 | B1 * | 11/2003 | Stewart | 455/456.6 |
| 6,674,849 | B1 * | 1/2004 | Froeberg | 379/201.06 |
| 6,678,357 | B2 | 1/2004 | Stumer et al. | 379/45 |
| 6,766,174 | B1 * | 7/2004 | Kenyon | 455/457 |
| 6,950,407 | B1 | 9/2005 | Huddle | 370/254 |
| 7,246,154 | B1 * | 7/2007 | Sitaraman et al. | 709/217 |
| 7,385,992 | B1 * | 6/2008 | Koch et al. | 370/401 |
| 7,486,958 | B2 * | 2/2009 | Sheha et al. | 455/456.3 |
| 7,706,356 | B1 * | 4/2010 | Olshansky et al. | 370/352 |
| 2002/0087725 | A1 * | 7/2002 | Cummings et al. | 709/243 |
| 2003/0187949 | A1 * | 10/2003 | Bhatt et al. | 709/218 |
| 2004/0057425 | A1 | 3/2004 | Brouwer et al. | 370/352 |
| 2005/0063519 | A1 | 3/2005 | James | 379/45 |
| 2005/0090225 | A1 | 4/2005 | Muehleisen et al. | 455/404.1 |
| 2005/0135569 | A1 | 6/2005 | Dickinson et al. | 379/45 |
| 2005/0213716 | A1 * | 9/2005 | Zhu et al. | 379/45 |
| 2005/0238158 | A1 * | 10/2005 | Nguyen et al. | 379/215.01 |
| 2006/0031385 | A1 * | 2/2006 | Westerdal | 709/217 |
| 2006/0039539 | A1 * | 2/2006 | Goldman et al. | 379/45 |
| 2006/0268902 | A1 * | 11/2006 | Bonner | 370/401 |
| 2007/0104183 | A1 * | 5/2007 | Bakke et al. | 370/352 |
| 2007/0147348 | A1 * | 6/2007 | Lu | 370/352 |

(Continued)

OTHER PUBLICATIONS

Jackson, Donny, "Nortel proposes VoIP 911 solution," *Mobile Radio Technology*, May 1, 2004.

(Continued)

*Primary Examiner* — Asad M Nawaz
*Assistant Examiner* — Wutchung Chu

(57) ABSTRACT

A clearinghouse is used to determine caller location for VoIP calls. The clearinghouse maintains (i) a first correlation between a first IP address and a first ISP and (ii) a second correlation between a second IP address and a second ISP. The clearinghouse receives the first IP address from a VoIP service provider (VSP). The first IP address is a source address of a request from a VoIP telephone to set up a call, received by the VSP from the first ISP. The clearinghouse references the first correlation and queries the first ISP with the first IP address. The clearinghouse then receives from the first ISP a location associated with the first IP address. The clearinghouse transmits this location to an entity such as the VSP or, for a 911 call, perhaps a PSAP. The clearinghouse may select the PSAP based at least in part on the location.

21 Claims, 5 Drawing Sheets

U.S. PATENT DOCUMENTS

2007/0253413 A1* 11/2007 Citron et al. ............... 370/389
2008/0281706 A1* 11/2008 Sullivan .................... 705/14

OTHER PUBLICATIONS

Vonage® VoIP Forum, http://www.vonage-forum.com/ftopic3862.html, Mar. 2, 2005.

News.com message board, http://news.com.com/5208-7352-0.html?forumID=1&threadID=1411&messageID=6703&start=151, Jul. 21, 2004.

"Neustar introduces clearinghouse solution," Mercator Capital VoIP Newsletter, Sep. 2004, p. 3.

"NeuStar Joins National Emergency Number Association Next Generation E-911 Program," NeuStar® press release, Apr. 25, 2005.

Schulzrinne, H., and Marshall, R., "Requirements for Emergency Context Resolution with Internet Technologies," draft-schulzrinne-ecrit-requirements-01, May 2005.

"Answering the Call for 9-1-1 Emergency Services in an Internet World: a 9-1-1 VoIP Primer and Progress Report on the VON/NENA Agreement," Voice on the Net Coalition, Jan. 2005.

"VoIP Emergency Calling Services," Intrado, Inc., 2003.

Syniverse Technologies, Inc. document, pp. 22-32, 2005.

"Intrado Announces Suite of V9-1-1SM Solutions to Meet the Emergency Services Needs of the Growing VoIP Market," http://www.intrado.com/main/press/pressreleases/pressreleasearchive/040318.htm, Mar. 18, 2004.

* cited by examiner

USING A CLEARINGHOUSE TO DETERMINE CALLER LOCATION FOR VOIP CALLS

BACKGROUND

1. Technical Field

The present invention relates to Voice over Internet Protocol (VoIP) telephony, and more particularly to properly routing and enhancing emergency-services (911) VoIP calls.

2. Description of Related Art

In recent history, specifically in the latter half of the 20th century, a standardized system emerged for people to use when the need arose to place a telephone call to request emergency services. In particular, it has become almost universal in the United States, that, when a person places such an emergency-services call, they do so by dialing 911. This typically results in the caller being connected with a call-answering center typically known as a public safety answering point (PSAP). An operator at the PSAP may then connect the caller with a first responder suited to the caller's particular emergency, to the extent that it can be determined during the call.

It is too often the case, however, that emergency-services (911) calls are disconnected at critical times. Furthermore, it is also too frequent that a caller is unable to adequately convey their location to a PSAP operator, perhaps due to any number of reasons such as age, language barriers, a need to keep quiet in dangerous circumstances, health reasons related or unrelated to the emergency giving rise to the call, and so on. In response to these phenomena, a concept known as "Enhanced 911" (E911 or E-911) was conceived and implemented. E-911 calls are enhanced in the sense that certain signaling elements and databases are leveraged in order to automatically present both a callback number and the caller's location to the PSAP. This way, the PSAP operator can reach the caller in the event of an unintentional or necessary disconnection of the call, and the caller's location is readily available to the operator, obviating the need for the caller to successfully convey that location as a prerequisite to receiving aid.

Standing on the shoulders of the recent and continuing surge in popularity of the Internet, certain companies have begun offering telephony communications over the Internet. These communications are commonly known as Voice over Internet Protocol (VoIP) communications. The companies that offer this service to subscribers may be known as VoIP service providers (VSPs). Note that a particular person's VSP is not necessarily the same as that person's Internet Service Provider (ISP), which provides general access to the Internet. For example, a user may have general Internet connectivity via a cable modem provided by their ISP. This cable modem may have a port generally or specifically suitable for connecting a telephone adapted for VoIP communications (a "VoIP telephone"). When the user places a call using the VoIP telephone, the telephone may communicate via the cable modem, the ISP, and the Internet with a server maintained by a VSP; the call may then be set up and perhaps conducted via that server.

The E-911 system described above works well in the context of conventional telephony communication conducted using conventional telephones, telephone lines, and circuit-switched communication. However, VoIP telephones are flexible in that they may be disconnected from the above-described cable modem, connected to the Internet anywhere else in the world, and then used in the manner described above. In this context, calls from that VoIP telephone will still emanate from the telephone number associated on a permanent basis with the VoIP telephone. That telephone number may then be associated through the user's account with the user's home address. Thus, an emergency-services call placed by the VoIP telephone from a location away from home (and perhaps via a different ISP altogether) could mistakenly be assumed by a PSAP to be emanating from the user's home address. This could cause a delay in providing aid or a failure to provide aid, with tragic or at least undesirable consequences.

SUMMARY

Methods and systems are provided for using a clearinghouse to determine caller location for VoIP calls. The clearinghouse maps IP addresses (or ranges of IP addresses) to particular ISPs. Upon receipt of a call-setup message from a VoIP telephone, a VSP queries the clearinghouse with the source IP address of that call-setup message. The clearinghouse uses that source IP address to identify a particular ISP, and then queries that ISP with that same source IP address. The ISP then uses that source IP address to identify a location associated with that address, and transmits an indication of that location to the clearinghouse. The clearinghouse may then communicate that indicated location to the VSP, a PSAP, or some other entity. In this way, one or more VSPs may rely on the clearinghouse to translate source IP addresses to physical locations, regardless of the ISP from which a particular call-setup message originates.

In one embodiment, the present invention may take the form of a method. In accordance with the method, a clearinghouse maintains in data storage (i) a first correlation between a first IP address and a first ISP and (ii) a second correlation between a second IP address and a second ISP. The clearinghouse receives the first IP address from a VSP, wherein the first IP address is a source IP address of a request from a VoIP telephone to set up a call, the VSP having received the request from the VoIP telephone at least in part via the first ISP. Responsive to receiving the first IP address, the clearinghouse references the first correlation and responsively queries the first ISP with the first IP address. The clearinghouse receives from the first ISP an indication of a location associated with the first IP address. Responsive to receiving the indication of the location, the clearinghouse transmits the indication of the location to a first entity.

These as well as other aspects and advantages will become apparent to those of ordinary skill in the art by reading the following detailed description, with reference where appropriate to the accompanying drawings.

BRIEF DESCRIPTION OF THE DRAWINGS

Various exemplary embodiments are described herein with reference to the following drawings, wherein like numerals denote like entities.

DETAILED DESCRIPTION OF EXEMPLARY EMBODIMENTS

1. Overview

Figure 1:
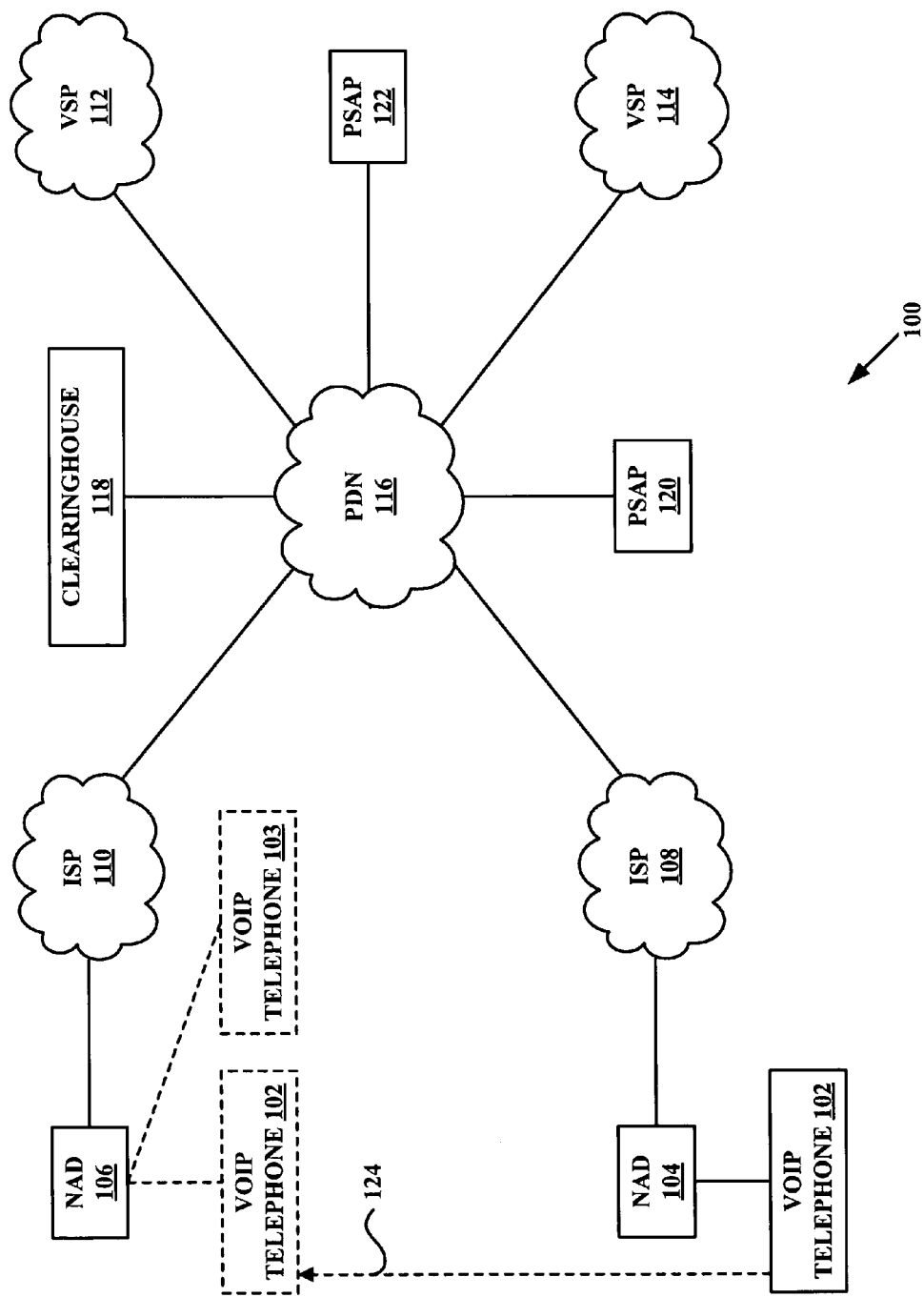
FIG. 1 is a simplified block diagram of a communication system that may be used in accordance with exemplary embodiments.

As presently contemplated, a VoIP subscriber may use a VoIP telephone to place a call, which may be an emergency-services call, such as a 911 call. The VoIP telephone may have Internet connectivity through an ISP, perhaps via a network access device such as a cable modem. As part of the call setup for this 911 call, the VoIP telephone may send a call-setup message, such as a Session Initiation Protocol (SIP) message, via the ISP and the Internet to a call-setup server maintained by the subscriber's VSP. This call-setup message may include a source IP address, which could be the IP address of the VoIP telephone, the cable modem, a computer or router connecting to the ISP via the cable modem, or some other device.

Among these possibilities, a router is a likely example due to consumers' desire to operate more than one home-computing device via a single network access device. As such, the IP address mentioned above would likely be assigned by the ISP to the router via the cable modem. In particular, the router would send a Dynamic Host Configuration Protocol (DHCP) message via the cable modem and the ISP's cable/fiber-optic network to a DHCP server maintained by the ISP. The DHCP server would then assign the IP address to the router. The router would, in turn, assign private IP addresses to the VoIP telephone, laptop computers, and/or any other devices operated on the customer premises. The router would then perform what is known as Network Address Translation (NAT) on inbound and outbound packets, so that any packets sent by the VoIP telephone would appear to emanate from the router's IP address.

Upon receipt of this call-setup message, the VSP would not have a reliable physical location to associate with the VoIP telephone. The VoIP telephone could very well be connected at its "home" location, which may be the street address associated with the VoIP subscriber's account. However, the VoIP telephone could also have been moved to some other location. At this other location, the "call" would still appear to the VSP to be coming from the VoIP telephone's assigned telephone number.

The VSP may then query a clearinghouse, which may comprise a server, using the source IP address of the 911-call setup message. The clearinghouse facilitates obtaining physical locations associated with VoIP calls in part by maintaining mappings between IP addresses and ISPs. Upon receipt of the source IP address from the VSP, the clearinghouse identifies the ISP associated with that IP address. The clearinghouse then queries that ISP using that IP address, and receives from the ISP an indication of a physical location. To be able to respond to such queries from the clearinghouse, the ISP would maintain a real-time association between the IP addresses assigned by its DHCP server and the physical locations associated with the cable lines and/or cable modems through which or to which those addresses were assigned.

The physical location associated with the source IP address of the 911-call setup message having been identified, the clearinghouse then communicates an indication of that location to the requesting VSP, a PSAP, and/or any other entity. In some embodiments, the clearinghouse or the VSP could use that physical location to select a PSAP to service the 911 call, in addition to communicating the location information to the PSAP.

2. Exemplary Architecture a. Exemplary Communication System

FIG. 1 is a simplified block diagram of a communication system that may be used in accordance with exemplary embodiments. It should be understood that this and other arrangements described herein are set forth only as examples. Those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. Various functions may be carried out by a processor executing instructions stored in memory.

As shown in FIG. 1, the communication system 100 includes VoIP telephones 102 and 103, network access devices (NAD) 104 and 106, ISPs 108 and 110, VSPs 112 and 114, a packet-data network (PDN) 116, a clearinghouse 118, and PSAPs 120 and 122. It should be understood that any number of other entities could be present as well. For example, there could be any number of devices in communication with PDN 116. Furthermore, there could be any number of routers, other devices, and/or networks making up all or part of any of the communication links, such as the link between PDN 116 and PSAP 122.

VoIP telephones 102 and 103 may be any VoIP telephony devices arranged to carry out the VoIP-telephone functions described herein. As such, the VoIP telephones may each have a user interface, a network interface, a processor, and data storage. The user interface may include a handset, speaker, microphone, one or more buttons, a display screen, and/or any other devices now known or later developed for receiving inputs from and conveying outputs to users. The network interface could include an Ethernet card, a wireless interface such as a Code Division Multiple Access (CDMA) interface, an IEEE 802.11 interface, a Bluetooth interface, and/or any other interface now known or later developed for communicating with one or more other network elements. The network interface could also include a conventional telephone interface for connecting to a network access device equipped to convert between communications over a conventional telephone line and packet-data communications over PDN 116.

NADs 104 and 106 could each include a cable modem, a digital subscriber line (DSL) modem, a router, a wireless router, a telephony interface, an Ethernet interface, and/or any other hardware and software to facilitate a connection between a VoIP telephone such as VoIP telephone 102 and an ISP such as ISP 108. As such, one or both of NADs 104 and 106 may be equipped to convert between communications over a conventional telephone line and packet-data communications with an ISP, perhaps over a hybrid cable/fiber-optic network.

ISPs 108 and 110 may include one or more network devices and/or one or more networks that together provide an interface for packet-data communication between a network access device and PDN 116. As an example, if NAD 104 was a combined router and cable modem, then ISP 108 may include a hybrid cable/fiber network for carrying packet data between NAD 104 and a device known as a cable headend, which may then convert between packet-data carried over the cable/fiber network and packet-data carried over PDN 116.

VSPs 112 and 114 may include one or more network devices and/or one or more networks that together provide VoIP telephone service to one or more VoIP telephones such as VoIP telephone 102. As an example, VSP 112 may maintain a call-setup server having an Ethernet interface with PDN 116. VSP 112 may also maintain one or more media gateways that interface between communications sent over PDN 116 and one or more other packet-switched networks and/or one or more circuit-switched networks such as the Public Switched Telephone Network (PSTN). The VSPs may maintain databases of subscriber information, as well as handle the establishment and teardown of VoIP calls, including 911 VoIP calls.

PDN 116 may include one or more wide area networks, one or more local area networks, one or more public networks such as the Internet, one or more private networks, and/or one or more wired or wireless networks. Devices in communication with PDN 116 may exchange data using the Internet Protocol (IP), and may be identified by an IP address.

Clearinghouse 118 may include any networking device or devices, such as one or more servers, arranged to communicate over PDN 116 and to carry out the clearinghouse functions described herein. As such, clearinghouse 118 may include a network interface, a processor, and data storage. Clearinghouse 118 is described more fully in connection with FIG. 2.

PSAPs 120 and 122 may each be call centers equipped and staffed to receive emergency-services calls and to respond to those calls by sending appropriate aid to the calling parties. Note that one or both of PSAPs 120 and 122 could be connected to the PSTN rather than or in addition to being connected to PDN 116. As such, a device known as a media gateway could be present on the communication link between PDN 116 and either or both PSAPs. This media gateway would be a networking device arranged to convert between packet-switched and circuit-switched communication, and is a device that is known in the art. Call centers such as PSAPs are known in the art as well, and thus are not described in great detail here.

FIG. 1 also includes a dashed arrow 124 from a solid representation of VoIP telephone 102 to a dashed representation of VoIP telephone 102. This arrow 124 is meant to represent a move by VoIP telephone 102 from a first situation to a second situation. The first situation is that VoIP telephone 102 is connected to ISP 108 via NAD 104. The second situation is that VoIP telephone 102 is connected to ISP 110 via NAD 106. Furthermore, VoIP telephone 103 is represented in dashed form in FIG. 1. This dashed representation is meant to indicate in general that an NAD such as NAD 106 could—but does not necessarily—have more than one VoIP telephone in communication with it at a given time.

b. Exemplary Clearinghouse

Figure 2:
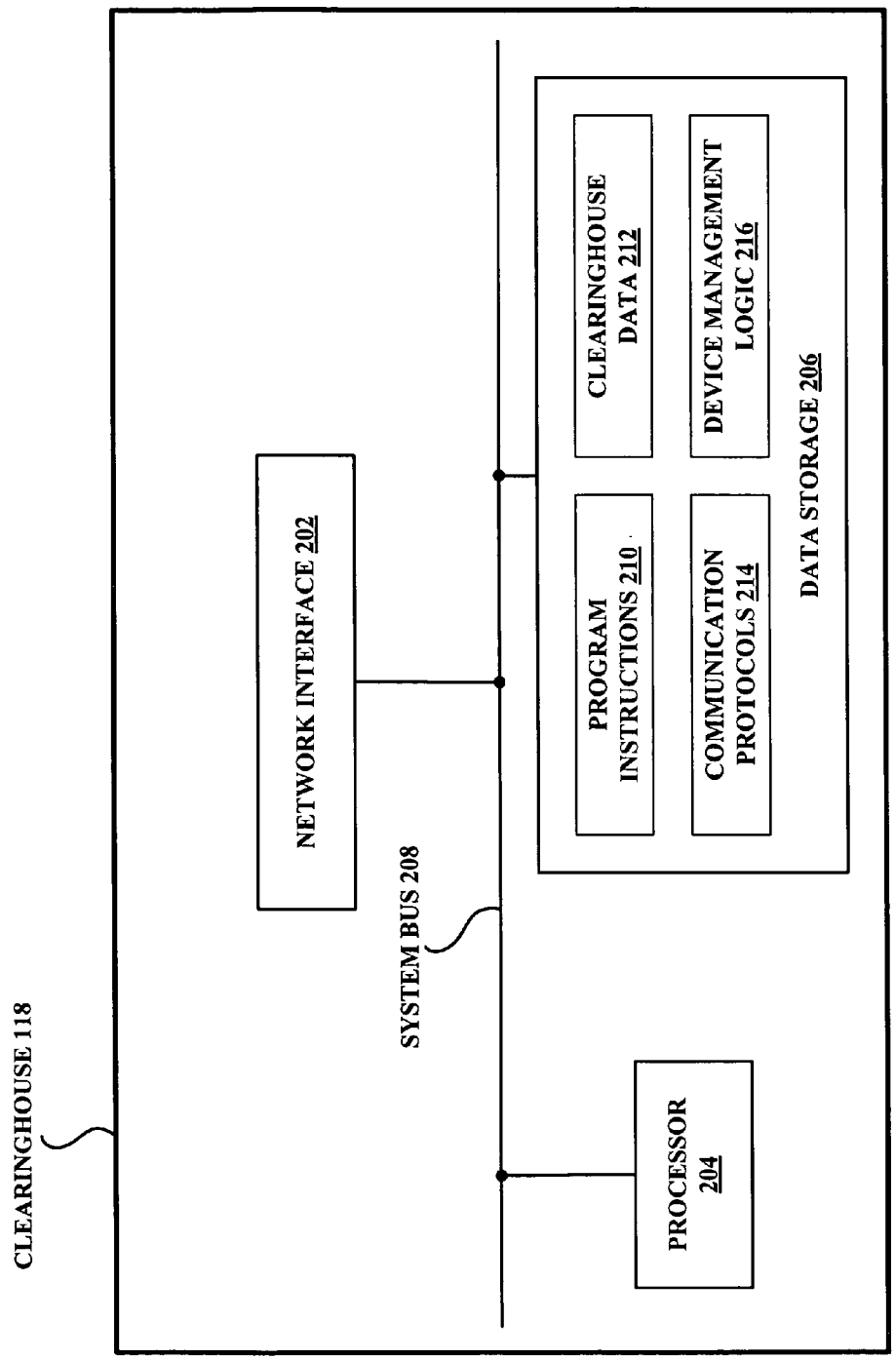
FIG. 2 is a simplified block diagram of an exemplary clearinghouse, which may be used in accordance with exemplary embodiments.

FIG. 2 is a simplified block diagram of an exemplary clearinghouse, which may be used in accordance with exemplary embodiments. In particular, FIG. 2 shows that clearinghouse 118 includes a network interface 202, a processor 204, and data storage 206, all of which may be communicatively linked by a communication path 208. Note that clearinghouse 118 could take the form of a single device, such as a network server, in which case communication path 208 may take the form of that device's system bus. However, clearinghouse 118 could also take the form of multiple devices, perhaps with network-interface functions handled by one device and data-storage functions handled by another device. In this scenario, communication path 208 may take the form of one or more cables, networks, wireless air interfaces, and/or any other type of communication path.

Network interface 202 may be any combination of hardware and software that clearinghouse 118 uses to communicate over PDN 116. As such, network interface 202 may include an Ethernet card and/or any other type of hardware or software. In some embodiments, clearinghouse 118 may communicate wirelessly with PDN 116, in which case network interface 202 may include a wireless-communication chipset and perhaps an antenna.

Processor 204 may comprise multiple (e.g., parallel) processors, such as a general purpose microprocessor and/or a discrete digital signal processor. Data storage 206 may take various forms, in one or more parts, such as a non-volatile storage block and/or a removable storage medium. Data storage 206 may store program instructions 210, clearinghouse data 212, communication protocols 214, and device management logic 216. Program instructions 210 may be executable by processor 204 to carry out various clearinghouse functions described herein. Clearinghouse data 212 may include correlations between IP addresses (and/or ranges or IP addresses) and ISPs associated with those IP addresses, as well as any other types of data.

Communication protocols 214 may be useful to receive data from and send data to one or more network entities, and may include any protocols mentioned herein, any proprietary protocols, and/or any other protocols. Compatible protocols may be stored in other entities in communication with clearinghouse 118. Device management logic 216 may be used to manage aspects of clearinghouse 118 such as memory and file management.

c. Exemplary Clearinghouse Table

Figure 3:
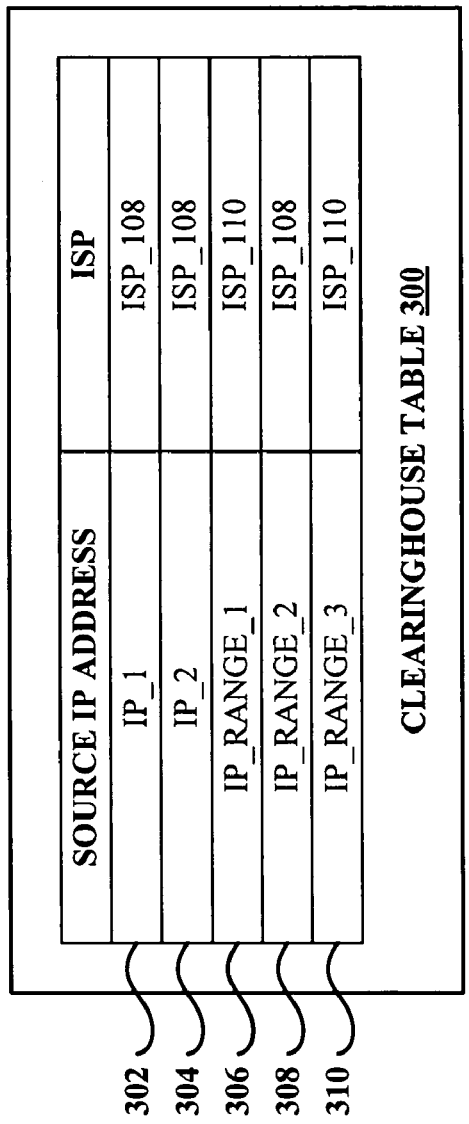
FIG. 3 is a simplified block diagram of an exemplary clearinghouse table, which may be used in accordance with exemplary embodiments.

FIG. 3 is a simplified block diagram of an exemplary clearinghouse table, which may be used in accordance with exemplary embodiments. In particular, FIG. 3 depicts a clearinghouse table 300 that may be stored as clearinghouse data 212, and that correlates IP addresses and ranges of IP addresses with ISPs. Clearinghouse table 300 is merely an example of one way to correlate IP addresses with ISPs, and other ways could be used as well.

Also, any number of correlations could be maintained; FIG. 3 depicts five as an example. Specifically, row 302 shows a single IP address (represented as IP_1) correlated with ISP 108 of FIG. 1. Row 304 shows an IP address IP_2 also correlated with ISP 108. Note that IP_1 and IP_2 are representations, and that an actual clearinghouse table may store IP addresses in the known form A.B.C.D, where each of A, B, C, and D are integers between 0 and 255.

As stated, clearinghouse table 300 also includes correlations between ranges of IP addresses and ISPs. Row 306 correlates a range IP_RANGE_1 with ISP 110. Row 308 correlates IP_RANGE_2 with ISP 108. Finally, row 310 correlates IP_RANGE_3 with ISP 110. These ranges could be contiguous or noncontiguous sets of IP addresses. Clearinghouse 118 may be programmed to identify cases where a given IP address matches a single IP address, a contiguous range, and/or a noncontiguous range.

The ISPs that are indicated by the ISP column in clearinghouse table 118 may be represented in different ways. Some examples include representation by name, by an IP address of a server maintained by the particular ISP, by a phone number, or by any other identifier or set of identifiers that indicate a particular ISP.

d. Exemplary ISP Table

Figure 4:
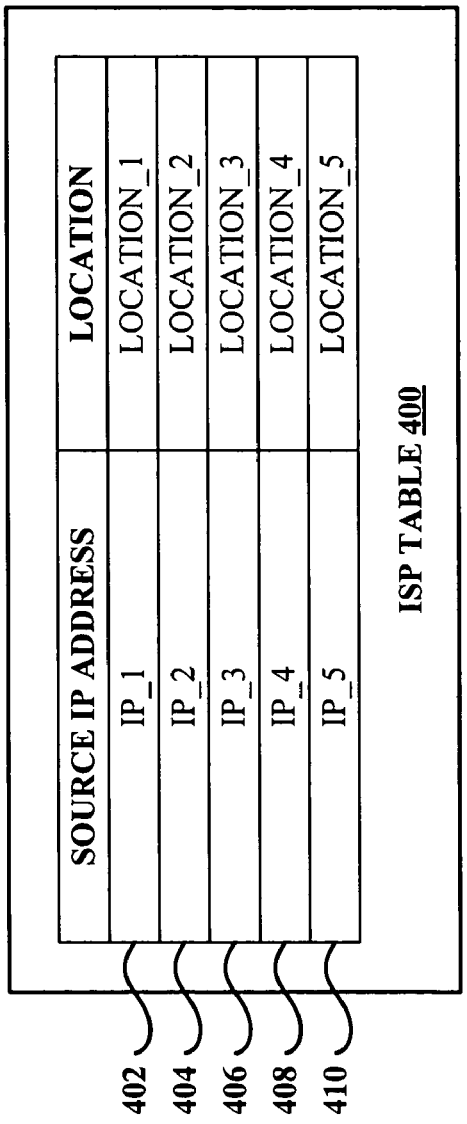
FIG. 4 is a simplified block diagram of an exemplary ISP table, which may be used in accordance with exemplary embodiments.

FIG. 4 is a simplified block diagram of an exemplary ISP table, which may be used in accordance with exemplary embodiments. In particular, FIG. 4 depicts an ISP table 400 that may be maintained by an ISP such as ISP 108, and that correlates IP addresses with indications of various locations. An ISP may maintain ISP table 400 by using a network server having components similar to those depicted in FIG. 2. ISP table 400 is merely an example of one way to correlate IP addresses with locations, and many other ways could be used as well.

Also, any number of correlations could be maintained; FIG. 4 depicts five such correlations as an example. Specifically, row 402 correlates an IP address IP_1 with a location represented as LOCATION_1. Rows 404 through 410 correlate IP_2 through IPS with LOCATION_2 through LOCATIONS, respectively. Note that although ISP table 400 depicts single IP addresses correlated with single locations, it could be the case that more than one IP address is correlated with a particular location. For example, a single room in an office building or dormitory could have multiple computers, each having their own IP address.

With respect to the types of location indications that could be stored in ISP table 400, many possibilities exist. As a non-exhaustive list of examples, ISP table 400 may store one or more indications of the following types of locations: a street address, an intersection, a landmark, a building, a house, an apartment, a condominium, a housing unit, an office, a cubicle, a room, a floor, a city, a state, a zip code, a county, a country, a town, a village, a municipality, a latitude, a longitude, a height, an altitude, and/or a set of Global Positioning System (GPS) coordinates.

Using cable modems as exemplary network access devices, in operation, an ISP may know as a result of account initiation and equipment installation which cable modems are associated with which locations. A particular location, such as a residence, would typically use the same cable modem for an extended period of time. This cable modem may have a permanent identifier such as a Media Access Control (MAC) address. Furthermore, this cable modem may be statically connected to the same line of coaxial cable that runs from the residence out to the ISP's network. Thus, the residence may also be statically or semi-permanently associated with a given port of a given switch in the ISP's network. Upon dynamically assigning an IP address to this residence using a protocol such as DHCP, the ISP can then update a table such as ISP table 400 to associate that IP address with the static MAC address, port, cable modem, etc. to which or through which the IP address was assigned.

3. Exemplary Operation

Figure 5:
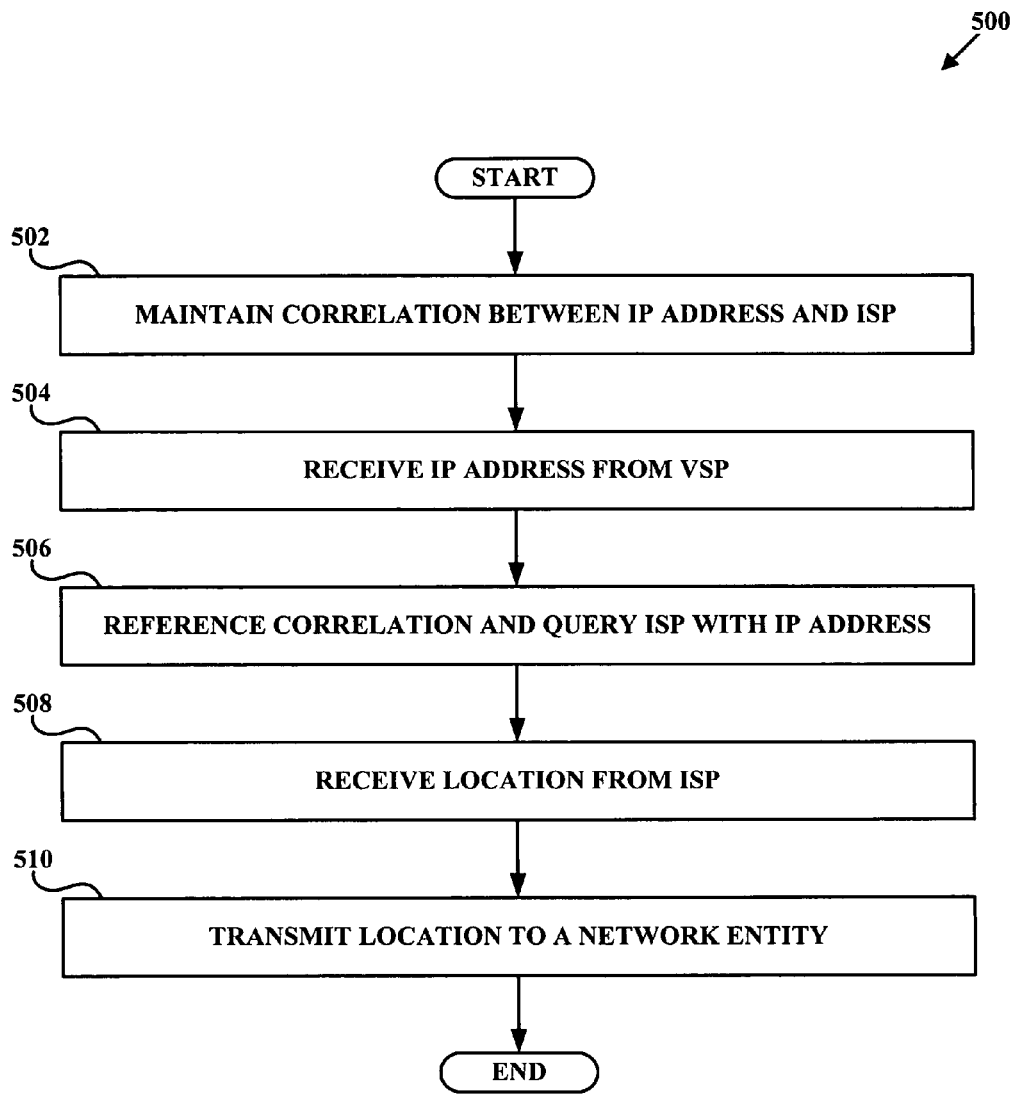
FIG. 5 is a flowchart of an exemplary method that makes use of the communication system of FIG. 1, in accordance with exemplary embodiments.

FIG. 5 is a flowchart of an exemplary method that makes use of the communication system of FIG. 1, in accordance with exemplary embodiments. As shown in FIG. 5, the method 500 begins at step 502, when clearinghouse 118 maintains in data storage 206 (i) a first correlation between a first IP address and ISP 108 and (ii) a second correlation between a second IP address and ISP 110. At step 504, clearinghouse 118 receives the first IP address from VSP 112. At step 506, clearinghouse 118 references the first correlation and responsively queries ISP 108 with the first IP address. At step 508, clearinghouse 118 receives a location from ISP 108. At step 510, clearinghouse 118 transmits the location to a network entity such as VSP 112 or PSAP 120. These steps are further explained in the following subsections.

a. Correlate IP Addresses With ISPs

At step 502, clearinghouse 118 maintains in data storage 206 (i) a first correlation between a first IP address, such as IP_1, and a first ISP, such as ISP 108, and (ii) a second correlation between a second IP address, such as an IP address IP_7 in the IP-address range IP_RANGE_3, and a second ISP, such as ISP 110. Step 502 could be carried out by clearinghouse 118 maintaining a table such as clearinghouse table 300 of FIG. 3.

From time to time, clearinghouse 118 may receive updated information regarding which IP addresses and IP-address ranges are correlated with particular ISPs. This information may pertain to IP addresses and IP address ranges for which, at that time, clearinghouse 118 either has or does not have data. Thus, the information may be related to new records that clearinghouse 118 should add to its records, or the information may be related to information that clearinghouse 118 should use to modify its existing records. This information may be sent to clearinghouse 118 from particular ISPs, from devices to which ISPs have assigned IP addresses, or perhaps from entities responsible for assigning ranges of addresses to particular ISPs. In response to receiving these updates, clearinghouse 118 may update its records accordingly.

b. Receive IP Address from VSP

At step 504, clearinghouse 118 receives the IP address IP_1 from VSP 112. Here, IP_1 is the source IP address of a request sent from VoIP telephone 102 to VSP 112 to set up a call. VSP 112 received this request from VoIP telephone 102 along a communication path that includes NAD 104, ISP 108, and PDN 116. In this example, this call is an emergency-services call that a user initiated by dialing 911 on VoIP telephone 102 and then pressing a button such as "Talk." This request could be a SIP message, and this and the other messages described herein could optionally be sent using secured or encrypted communications.

c. Reference Correlation and Query ISP with IP Address

At step 506, responsive to receiving the IP address IP_1, clearinghouse 118 references the first correlation and responsively queries ISP 108 with IP_1. Thus, in this example, the first correlation could be row 302 of clearinghouse table 300. Clearinghouse 118 may use IP_1 as a key when searching this table, and thereby identify ISP 108 as the ISP correlated with that IP address. Upon making that identification, clearinghouse 118 may query ISP 108 by sending ISP 108 a message that includes IP_1 and requests a location associated with that IP address.

d. Receive Location from ISP

At step 508, clearinghouse 118 receives from ISP 108 an indication of a first location, which is associated with the first IP address. Here, clearinghouse 118 receives the indication LOCATION_1 from ISP 108, which is correlated in row 402 of ISP table 400 with the IP address IP_1. As explained above, ISP 108 may maintain a static or semi-permanent correlation between points of attachment to or static identifiers on its network (cable modems, MAC addresses, ports, etc.) and physical locations (hotel rooms, offices, houses, apartments, etc.).

Upon dynamically assigning IP addresses associated with those points of attachment or static identifiers, the ISP may then dynamically update a set of correlations such as ISP table 400 between IP addresses and physical locations. A given ISP may also store associations between dynamically-assigned IP addresses and DSL usernames and/or passwords. The ISP would then be able to link the static or semi-permanent associations between this DSL account information and physical-location information to be able to correlate IP addresses to the locations.

ISP 108 may thus receive the IP address IP_1 from clearinghouse 118, and responsively reference a table such as ISP table 400 to identify LOCATION_1 as the location associated with IP_1. ISP 108 may then transmit this location indication to clearinghouse 118. LOCATION_1 could include one or more indications of any of the types of locations listed above, as well as any other indications of any other type of locations.

e. Transmit Location to Network Entity

At step 510, responsive to receiving from ISP 108 the location indication, clearinghouse 118 transmits that indication to a network entity. In some embodiments, that entity is VSP 112. In embodiments where the call associated with the call-setup message is an emergency-services call, VSP 112 may then transmit the location indication to a PSAP such as PSAP 120. VSP 112 may also route the 911 call to PSAP 120. In some embodiments, VSP 112 may select PSAP 120 to handle the 911 call based at least in part on the location indication.

In other embodiments, where the call is an emergency-services call, the entity to which clearinghouse 118 transmits the location indication is a PSAP such as PSAP 120. In some cases, clearinghouse 118 may select the PSAP to which to transmit the location indication based at least in part on that location indication itself.

Whether the location indication is transmitted to PSAP 120 directly from clearinghouse 118 or via VSP 112, other information in addition to the location indication may be sent to the PSAP by VSP 112 and/or clearinghouse 118. This additional information could include the calling number, the VoIP subscriber's name, the VoIP subscriber's registered street address, a timestamp for the call, and/or any other data. In some embodiments, the PSAP may correlate the received location indication with the call by using some or all of this data, the calling number probably proving the most useful in this respect.

4. Additional Examples a. VoIP Telephone Associates with Different ISP

The usefulness of the present invention may be further appreciated by considering an example where VoIP telephone 102 is disconnected from NAD 104 and moved to a second location where it establishes a connection with NAD 106, and thus has access to PDN 116 and VSP 112 via ISP 110 rather than ISP 108. VoIP telephone 102 may then initiate a call from that second location. This second call could be a 911 call as well. This example could involve a user taking VoIP telephone 102 to a friend's house and connecting VoIP telephone 102 to the friend's router, as depicted by arrow 124 of FIG. 1. An emergency could then develop, at which point the user of VoIP telephone 102 may use that phone to dial 911.

Here, VoIP telephone 102 may send a call-setup message via NAD 106, ISP 110, and PDN 116 to VSP 112. Note that the same VSP receives this message as in the above examples, since the VoIP telephone is still programmed to send such messages to the VSP that provides VoIP service to this telephone. This message is different than the one described above, however, in that it will have a different source IP address, due to its association with ISP 110. Thus, VSP 112 may query clearinghouse 118 using the IP address from this call-setup message, which in this example is an IP address IP_7, which falls within IP_RANGE_3 of FIG. 3.

Upon receipt of this query from VSP 112, clearinghouse 118 references clearinghouse table 300 and identifies that IP_7 indeed does fall within the range IP_RANGE_3, and thus that IP_7 is associated with ISP 110, per row 310 of clearinghouse table 300. Upon making this determination, clearinghouse 118 queries ISP 110 with the IP address IP_7.

ISP 110 may maintain a table similar to ISP table 400. Upon receipt of the query from clearinghouse 118, ISP 110 may use IP_7 as a key into such a table, to identify a location associated with IP_7. ISP 110 may then transmit an indication of this location to clearinghouse 118. Upon receiving this indication, clearinghouse 118 may then forward it to a network entity such as VSP 112, PSAP 120, or perhaps PSAP 122. In fact, clearinghouse 118 may select PSAP 122 based at least in part on the indication of the second location. PSAP 122 may be better suited to this location than PSAP 120, thus illustrating part of the value of the present invention.

b. Second VoIP Telephone Associated with Second ISP and Second VSP

In another example of the operation of the present invention, a second user may place a 911 call using VoIP telephone 103 via NAD 106, ISP 110, and PDN 116. In this example, VoIP telephone 103 may be associated with VSP 114 instead of with VSP 112. In that case, VSP 114 would query clearinghouse 118 with the source IP address of the call-setup message that is sent from VoIP telephone 103 to VSP 114. In this as in the above example, the IP address is IP_7, though this could have changed dynamically by the normal operation of DHCP.

From here, the processing and messaging would occur in substantially the same manner as that described above in connection with the example of VoIP telephone 102 placing a 911 call via NAD 106 and ISP 110. Thus, clearinghouse 118 may identify IP_7 as being associated with ISP 110 and responsively query ISP 110 for a location associated with that IP address. Thereafter, an indication of the same location as in the example above may be sent by ISP 110 to clearinghouse 118 in response to the query.

Clearinghouse 118 may then forward this indication to VSP 114 for forwarding to PSAP 122, or perhaps clearinghouse 118 may forward the location indication directly to PSAP 122. Also, as above, clearinghouse 118 and/or VSP 114 may select PSAP 122 to handle this 911 call based on the location indication received by clearinghouse 118 from ISP 110. Thus, the proper result is achieved: PSAP 122 handles emergency calls placed via NAD 106 and ISP 110, while PSAP 120 handles emergency calls place via NAD 104 and ISP 108, in both cases independent of the particular VoIP telephone and VSP used to place the call.

5. Conclusion

Various exemplary embodiments have been described above. Those skilled in the art will understand, however, that changes and modifications may be made to those examples without departing from the scope of the claims.

What is claimed is:

1. A method comprising:
a clearinghouse maintaining in data storage a plurality of correlations, each correlation being between a given internet service provider (ISP) and a respective range of one or more internet protocol (IP) addresses, wherein the plurality of correlations comprises a first correlation between a first ISP and a first range of one or more IP addresses, the first range comprising a first IP address, and wherein the clearinghouse is separate and distinct from every ISP in the plurality of correlations, such that none of the correlations comprises an ISP that comprises the clearinghouse;
the clearinghouse receiving the first IP address from a first voice-over-IP (VoIP) service provider (VSP), wherein the first IP address is a source IP address of a first request to set up a first call, the first VSP having received the first request from a first VoIP telephone at least in part via the first ISP, wherein the first VSP is separate and distinct from the first ISP, such that the first ISP does not comprise the first VSP, and wherein the first VSP is also separate and distinct from the clearinghouse, such that the first VSP does not comprise the clearinghouse;

responsive to receiving the first IP address, the clearinghouse referencing the plurality of correlations to identify that the first ISP is associated with the first IP address, and responsively querying the first ISP with the first IP address;

as a result of querying the first ISP with the first IP address, the clearinghouse receiving from the first ISP an indication of a first physical location of the first VoIP telephone, wherein the first physical location of the first VoIP telephone is associated with the first IP address; and responsive to receiving the indication of the first physical location of the first VoIP telephone, the clearinghouse transmitting the indication of the first physical location of the first VoIP telephone to a first entity.

2. The method of claim 1, wherein the first entity is the first VSP.

3. The method of claim 2, wherein the call is an emergency-services call, the method further comprising the first VSP transmitting the indication of the first physical location of the first VoIP telephone to a public safety answering point (PSAP).

4. The method of claim 3, further comprising the first VSP routing the first call to the PSAP.

5. The method of claim 4, further comprising the first VSP selecting the PSAP based at least in part on the indication of the first physical location of the first VoIP telephone.

6. The method of claim 1, wherein the call is an emergency-services call, and wherein the first entity is a public safety answering point (PSAP).

7. The method of claim 6, further comprising the clearinghouse selecting the PSAP based at least in part on the indication of the first physical location of the first VoIP telephone.

8. The method of claim 1, further comprising:
the clearinghouse receiving a correlation-update message; and
responsive to receiving the correlation-update message, the clearinghouse updating at least one correlation in the plurality of correlations.

9. The method of claim 1, wherein the first call is an emergency-services call.

10. The method of claim 1, further comprising:
the first ISP receiving the first IP address from the clearinghouse; and
responsive to receiving the first IP address, the first ISP referencing at least one correlation maintained in data storage by the first ISP to identify that the first IP address is associated with the indication of the first physical location of the first VoIP telephone, and responsively transmitting the indication of the first physical location of the first VoIP telephone to the clearinghouse.

11. The method of claim 1, wherein the indication of the first physical location of the first VoIP telephone represents at least one of a street address, an intersection, a landmark, a building, a house, an apartment, a condominium, a housing unit, an office, a cubicle, a room, a floor, a city, a state, a zip code, a county, a country, a town, a village, a municipality, a latitude, a longitude, a height, an altitude, and a set of Global Positioning System (GPS) coordinates.

12. The method of claim 1, wherein the plurality of correlations further comprises a second correlation between a second ISP and a second range of one or more IP addresses, the second range comprising a second IP address, the method further comprising:

the clearinghouse receiving the second IP address from the first VSP, wherein the second IP address is a source IP address of a second request to set up a second call, the first VSP having received the second request from the first VoIP telephone at least in part via the second ISP;

responsive to receiving the second IP address, the clearinghouse referencing the plurality of correlations to identify that the second ISP is associated with the second IP address, and responsively querying the second ISP with the second IP address;

as a result of querying the second ISP with the second IP address, the clearinghouse receiving from the second ISP an indication of a second physical location of the first VoIP telephone, wherein the second physical location of the first VoIP telephone is associated with the second IP address; and responsive to receiving the indication of the second physical location of the first VoIP telephone, the clearinghouse transmitting the indication of the second physical location of the first VoIP telephone to a second entity, wherein the second entity is selected from the group consisting of the first entity and an entity other than the first entity.

13. The method of claim 1, wherein the clearinghouse comprises a server.

14. The method of claim 1, wherein the plurality of correlations further comprises a second correlation between a second ISP and a second range of one or more IP addresses, the second range comprising a second IP address, the method further comprising:

the clearinghouse receiving the second IP address from a second VSP, wherein the second IP address is a source IP address of a second request to set up a second call, the second VSP having received the second request from a second VoIP telephone at least in part via the second ISP;

responsive to receiving the second IP address, the clearinghouse referencing the plurality of correlations to identify that the second ISP is associated with the second IP address, and responsively querying the second ISP with the second IP address as a result of querying the second ISP with the second IP address, the clearinghouse receiving from the second ISP an indication of a physical location of the second VoIP telephone, wherein the physical location of the second VoIP telephone is associated with the second IP address; and responsive to receiving the indication of the physical location of the second VoIP telephone, the clearinghouse transmitting the indication of the physical location of the second VoIP telephone to a second entity, wherein the second entity is selected from the group consisting of the first entity and an entity other than the first entity.

15. The method of claim 1, wherein the clearinghouse identifying that a given ISP is associated with a given IP address comprises the clearinghouse determining that the given IP address is in the range of IP addresses correlated with the given ISP.

16. The method of claim 1, wherein the first VSP is not an ISP.

17. A clearinghouse comprising:
a network interface;
a processor; and
data storage comprising (i) a plurality of correlations, each correlation being between a given internet service provider (ISP) and a respective range of one or more internet protocol (IP) addresses, wherein the plurality of correlations comprises a first correlation between a first ISP and a first range of one or more IP addresses, the first range comprising a first IP address, and wherein the clearinghouse is separate and distinct from every ISP in the plurality of correlations, such that none of the correlations comprises an ISP that comprises the clearinghouse and (ii) instructions executable by the processor to:

receive the first IP address from a voice-over-IP (VoIP) service provider (VSP), wherein the first IP address is a source IP address of a request to set up an emergency-services call, the VSP having received the request from a VoIP telephone at least in part via the first ISP, wherein the VSP is separate and distinct from the first ISP, such that the first ISP does not comprise the VSP, and wherein the VSP is also separate and distinct from the clearinghouse, such that the VSP does not comprise the clearinghouse;

responsive to receiving the first IP address, reference the plurality of correlations to identify that the first ISP is associated with the first IP address and responsively query the first ISP with the first IP address;

as a result of querying the first ISP with the first IP address, receive from the first ISP an indication of a physical location of the VoIP telephone, wherein the physical location of the VoIP telephone is associated with the first IP address; and responsive to receiving the indication of the physical location of the VoIP telephone, transmit the indication of the physical location of the VoIP telephone to a network entity.

18. The clearinghouse of claim 17, wherein the network entity is the VSP.

19. The clearinghouse of claim 17, wherein the network entity is a public safety answering point (PSAP).

20. The clearinghouse of claim 19, wherein the data storage further comprises instructions to select the PSAP based at least in part on the indication of the physical location of the VoIP telephone.

21. The clearinghouse of claim 17, wherein the indication of the physical location of the VoIP telephone represents at least one of a street address, an intersection, a landmark, a building, a house, an apartment, a condominium, a housing unit, an office, a cubicle, a room, a floor, a city, a state, a zip code, a county, a country, a town, a village, a municipality, a latitude, a longitude, a height, an altitude, and a set of Global Positioning System (GPS) coordinates.

* * * * *